US012577781B2

(12) United States Patent
Hendry et al.

(10) Patent No.: US 12,577,781 B2
(45) Date of Patent: **\*Mar. 17, 2026**

(54) IMAGE ENCODING/DECODING METHOD AND APPARATUS BASED ON SUBPICTURE INFORMATION ALIGNED BETWEEN LAYERS, AND RECORDING MEDIUM STORING BITSTREAM

(71) Applicant: LG Electronics Inc., Seoul (KR)

(72) Inventors: Hendry Hendry, Seoul (KR); Seung Hwan Kim, Seoul (KR); Seethal Paluri, Seoul (KR)

(73) Assignee: LG Electronics Inc., Seoul (KR)

( \* ) Notice: Subject to any disclaimer, the term of this patent is extended or adjusted under 35 U.S.C. 154(b) by 0 days.

This patent is subject to a terminal disclaimer.

(21) Appl. No.: 18/660,702

(22) Filed: May 10, 2024

(65) Prior Publication Data

US 2024/0292015 A1      Aug. 29, 2024

Related U.S. Application Data

(63) Continuation of application No. 17/916,260, filed as application No. PCT/KR2021/004030 on Mar. 31, 2021, now Pat. No. 12,022,101.

(Continued)

(51) Int. Cl.
H04N 19/119 (2014.01)
E04D 3/40 (2006.01)
(Continued)

(52) U.S. Cl.
CPC ........... *E04D 3/405* (2013.01); *H04N 19/105* (2014.11); *H04N 19/119* (2014.11);
(Continued)

(58) Field of Classification Search
CPC ..... H04N 19/82; H04N 19/105; H04N 19/119
See application file for complete search history.

(56) References Cited

U.S. PATENT DOCUMENTS 9,591,328 B2 \* 3/2017 Naing ................... H04N 19/105
11,284,077 B2 \* 3/2022 Hsu ..................... H04N 19/1883
(Continued)

OTHER PUBLICATIONS

Sub-pictures and sub-picture sets with level derivation; Boyce— 2019. (Year: 2019).\*

(Continued)

*Primary Examiner* — Luis Perez-Fuentes
(74) *Attorney, Agent, or Firm* — Fish & Richardson P.C.

(57) ABSTRACT

Provided is an image encoding/decoding method and apparatus. The image decoding method comprises obtaining subpicture information from a bitstream, deriving one or more subpictures in a current picture based on the subpicture information, and decoding a current subpicture in the current picture based on the subpicture information. The subpicture information may comprise a first flag specifying whether each of the one or more subpictures is treated as a picture, and, based on the bitstream including at least one first layer referring to a current layer including the current picture, the first flag for the first subpicture included in a first layer and corresponding to the current subpicture, and the first flag for the current subpicture have the same value.

14 Claims, 11 Drawing Sheets

Related U.S. Application Data

(60) Provisional application No. 63/003,250, filed on Mar. 31, 2020.

(51) Int. Cl.

| | |
|---|---|
| *H04N 19/105* | (2014.01) |
| *H04N 19/167* | (2014.01) |
| *H04N 19/172* | (2014.01) |
| *H04N 19/46* | (2014.01) |
| *H04N 19/82* | (2014.01) |

(52) U.S. Cl.
CPC ......... *H04N 19/167* (2014.11); *H04N 19/172* (2014.11); *H04N 19/46* (2014.11); *H04N 19/82* (2014.11)

(56) References Cited

U.S. PATENT DOCUMENTS

| | | | | |
|---|---|---|---|---|
| 11,490,097 | B2 * | 11/2022 | Chen .................... | H04N 19/184 |
| 11,683,528 | B2 * | 6/2023 | Seregin ............... | H04N 19/174 |
| | | | | 375/240.01 |
| 11,825,079 | B2 * | 11/2023 | Deng .................... | H04N 19/82 |
| 12,022,101 | B2 * | 6/2024 | Hendry ................. | H04N 19/46 |

OTHER PUBLICATIONS

Sub-picture based picture partitioning and decoding; Hannuksela; Mar. 2019. (Year: 2019).*

* cited by examiner

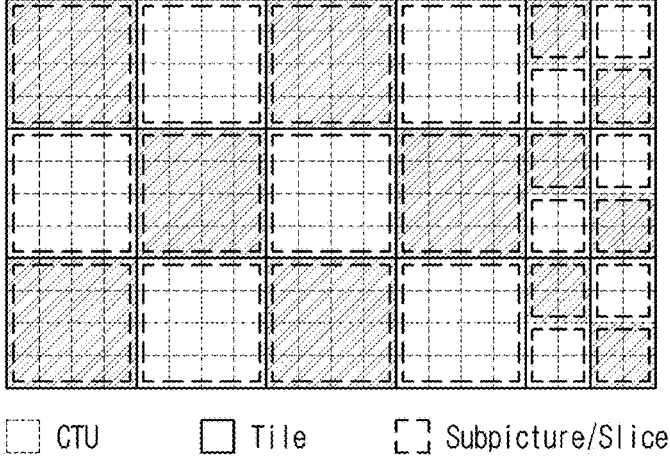

☐ CTU          ☐ Tile          ☐ Subpicture/Slice

FIG. 8

| seq_parameter_set_rbsp( ) { | Descriptor |
|---|---|
| ... | |
|   subpic_info_present_flag | u(1) |
|   if( subpic_info_present_flag ) { | |
|     sps_num_subpics_minus1 | ue(v) |
|     sps_independent_subpics_flag | u(1) |
|     for( i = 0; sps_num_subpics_minus1 > 0 && i <= sps_num_subpics_minus1; i++ ) { | |
|       if( i > 0 && pic_width_max_in_luma_samples > CtbSizeY ) | |
|         subpic_ctu_top_left_x[ i ] | u(v) |
|       if( i > 0 && pic_height_max_in_luma_samples > CtbSizeY ) { | |
|         subpic_ctu_top_left_y[ i ] | u(v) |
|       if( i < sps_num_subpics_minus1 && | |
|         pic_width_max_in_luma_samples > CtbSizeY ) | |
|         subpic_width_minus1[ i ] | u(v) |
|       if( i < sps_num_subpics_minus1 && | |
|         pic_height_max_in_luma_samples > CtbSizeY ) | |
|         subpic_height_minus1[ i ] | u(v) |
|       if( !sps_independent_subpics_flag) { | |
|         subpic_treated_as_pic_flag[ i ] | u(1) |
|         loop_filter_across_subpic_enabled_flag[ i ] | u(1) |
|       } | |
|     } | |
|   } | |
| ... | |
| } | |

IMAGE ENCODING/DECODING METHOD AND APPARATUS BASED ON SUBPICTURE INFORMATION ALIGNED BETWEEN LAYERS, AND RECORDING MEDIUM STORING BITSTREAM

CROSS-REFERENCE TO RELATED APPLICATIONS

This application is a continuation of U.S. application Ser. No. 17/916,260, filed on Sep. 30, 2022, which is a National Stage application under 35 U.S.C. § 371 of International Application No. PCT/KR2021/004030, filed on Mar. 31, 2021, which claims the benefit of U.S. Provisional Application No. 63/003,250, filed on Mar. 31, 2020. The disclosures of the prior applications are hereby incorporated by reference herein in their entirety.

TECHNICAL FIELD

The present disclosure relates to an image encoding/decoding method and apparatus, and, more particularly, to an image encoding and decoding method and apparatus based on subpicture information aligned between layers, and a recording medium storing a bitstream.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus based on subpicture information aligned between layers.

Another object of the present disclosure is to provide a computer-readable recording medium storing a bitstream generated by an image encoding method or apparatus according to the present disclosure.

Another object of the present disclosure is to provide a computer-readable recording medium storing a bitstream received, decoded and used to reconstruct an image by an image decoding apparatus according to the present disclosure.

Another object of the present disclosure is to provide a method of transmitting a bitstream generated by an image encoding method or apparatus according to the present disclosure.

The technical problems solved by the present disclosure are not limited to the above technical problems and other technical problems which are not described herein will become apparent to those skilled in the art from the following description.

Technical Solution

An image decoding method according to an aspect of the present disclosure may comprise obtaining subpicture information from a bitstream, deriving one or more subpictures in a current picture based on the subpicture information, and decoding a current subpicture in the current picture based on the subpicture information. The subpicture information may comprise a first flag specifying whether each of the one or more subpictures is treated as a picture, and, based on the bitstream including at least one first layer referring to a current layer including the current picture, the first flag for the first subpicture included in a first layer and corresponding to the current subpicture, and the first flag for the current subpicture have the same value.

An image decoding apparatus according to another aspect of the present disclosure may comprise a memory and at least one processor. The at least one processor may be configured to obtain subpicture information from a bitstream, to derive one or more subpictures in a current picture based on the subpicture information, and to decode a current subpicture in the current picture based on the subpicture information. The subpicture information may comprise a first flag specifying whether each of the one or more subpictures is treated as a picture, and, based on the bitstream including at least one first layer referring to a current layer including the current picture, the first flag for a first subpicture included in the first layer and corresponding to the current subpicture, and the first flag for the current subpicture have the same value.

An image encoding method according to another aspect of the present disclosure may comprise partitioning a current picture into one or more subpictures, generating a subpicture information on the one or more subpictures, and generating a bitstream by encoding image information including the subpicture information. The subpicture information comprises a first flag specifying whether each of the one or more subpictures is treated as a picture, and, based on the bitstream including at least one first layer referring to a current layer including the current picture, the first flag for a first subpicture included in the first layer and corresponding to the current subpicture, and the first flag for the current subpicture have the same value.

A computer-readable recording medium according to another aspect of the present disclosure may store the bitstream generated by the image encoding apparatus or the image encoding method of the present disclosure.

A transmission method according to another aspect of the present disclosure may transmit a bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus based on subpicture information aligned between layers.

Also, according to the present disclosure, it is possible to provide a computer-readable recording medium storing a bitstream generated by an image encoding method or apparatus according to the present disclosure.

Also, according to the present disclosure, it is possible to provide a computer-readable recording medium storing a bitstream received, decoded and used to reconstruct an image by an image decoding apparatus according to the present disclosure.

Also, according to the present disclosure, it is possible to provide a method of transmitting a bitstream generated by an image encoding method or apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

BRIEF DESCRIPTION OF THE DRAWINGS

FIG. 2 is a view schematically illustrating an image encoding apparatus, to which an embodiment of the present disclosure is applicable.

FIG. 3 is a view schematically illustrating an image decoding apparatus, to which an embodiment of the present disclosure is applicable.

FIG. 7 is a view illustrating an example of a subpicture.

FIG. 8 is a view illustrating an example of an SPS including information on a subpicture.

MODE FOR INVENTION

Figure 1:
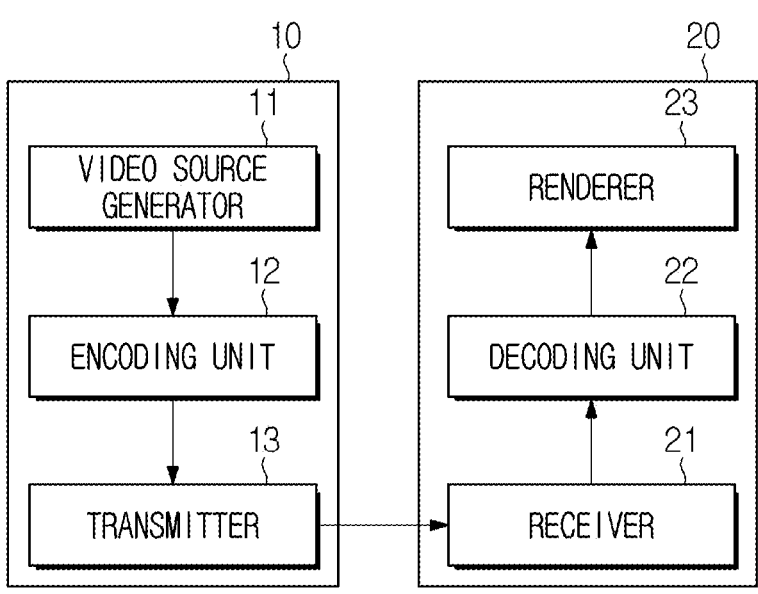
FIG. 1 is a view schematically illustrating a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The luma component block of the current block may be expressed by including an explicit description of a luma component block such as "luma block" or "current luma block. In addition, the "chroma component block of the current block" may be expressed by including an explicit description of a chroma component block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view schematically illustrating a video coding system, to which an embodiment of the present disclosure is applicable.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
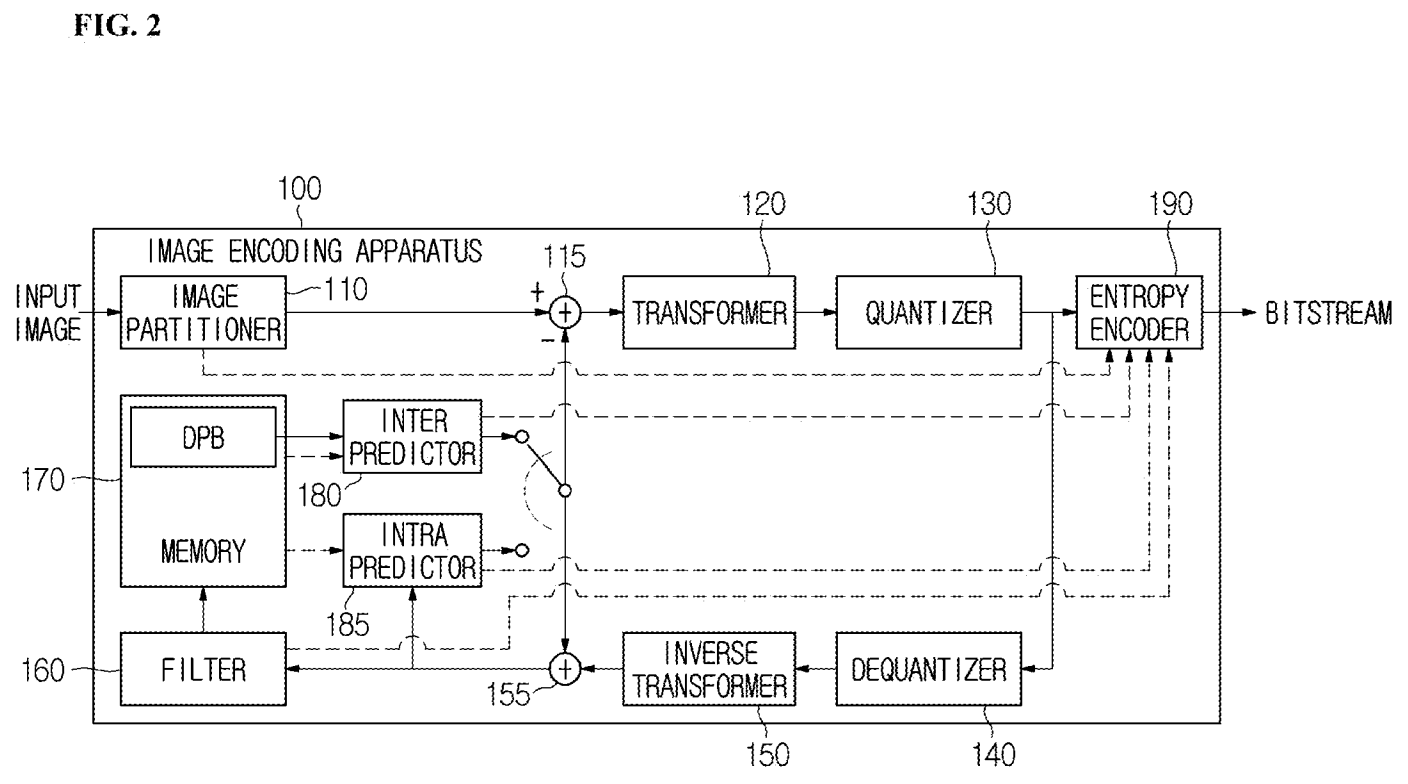

FIG. 2 is a view schematically illustrating an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be collectively referred to as a "predictor". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The predictor (the inter predictor 180 or the intra predictor 185) may perform prediction on a block to be processed (current block) and generate a predicted block including prediction samples for the current block. The predictor may determine whether intra prediction or inter prediction is applied on a current block or CU basis. The predictor may generate various information related to prediction of the current block and transmit the generated information to the entropy encoder 190. The information on the prediction may be encoded in the entropy encoder 190 and output in the form of a bitstream.

The intra predictor 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 185 may determine the prediction mode applied to the current block by using a prediction mode applied to a neighboring block.

The inter predictor 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter predictor

180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The predictor may generate a prediction signal based on various prediction methods and prediction techniques described below. For example, the predictor may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the predictor may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the predictor may be used to generate a reconstructed signal or to generate a residual signal. The subtractor 115 may generate a residual signal (residual block or residual sample array) by subtracting the prediction signal (predicted block or prediction sample array) output from the predictor from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bit-stream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter predictor 180 or the intra predictor 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter

160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter predictor 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter predictor 180. The memory 170 may store the motion information of the block from which the motion information in the current picture is derived (or encoded) and/or the motion information of the blocks in the picture that have already been reconstructed. The stored motion information may be transmitted to the inter predictor 180 and used as the motion information of the spatial neighboring block or the motion information of the temporal neighboring block. The memory 170 may store reconstructed samples of reconstructed blocks in the current picture and may transfer the reconstructed samples to the intra predictor 185.

Overview of Image Decoding Apparatus

Figure 3:
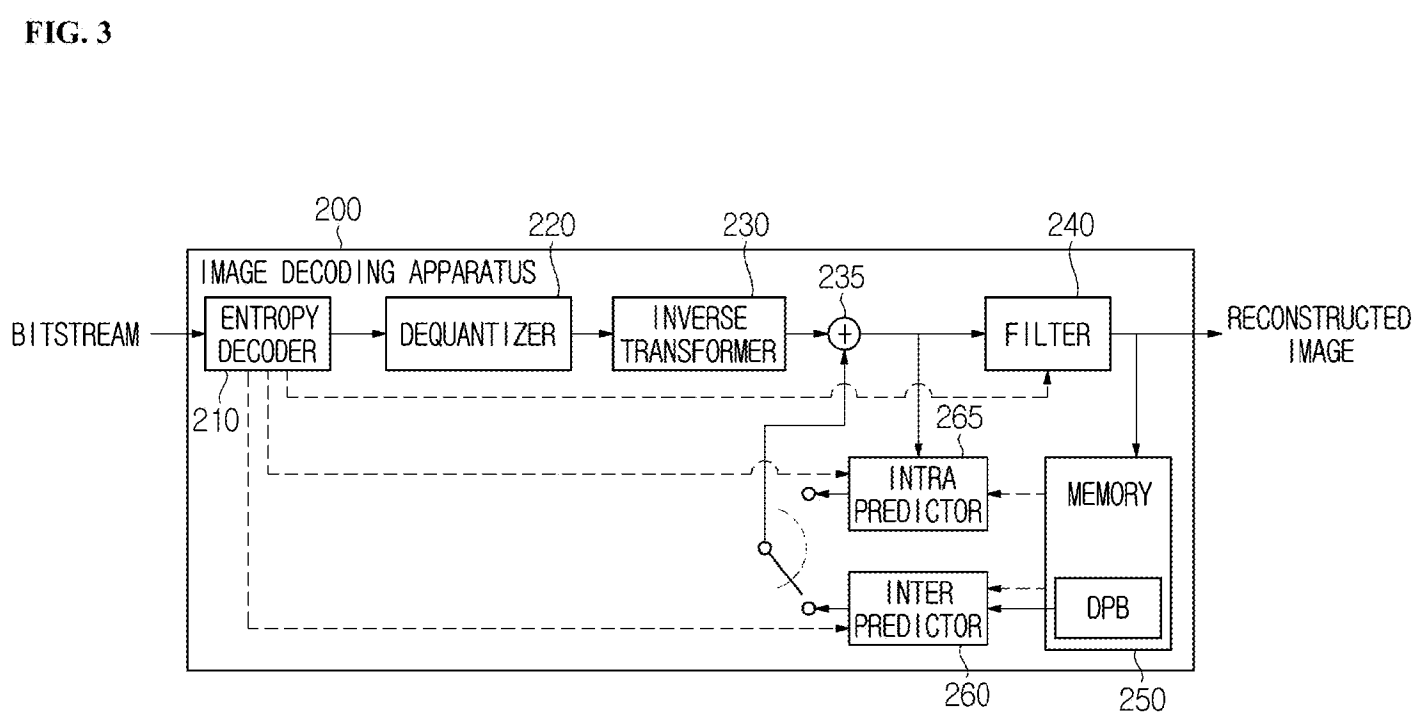

FIG. 3 is a view schematically illustrating an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively referred to as a "predictor". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the predictor (the inter predictor 260 and the intra predictor 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter predictor 160 or the intra predictor 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 210 and may determine a specific intra/inter prediction mode (prediction technique).

It is the same as described in the predictor of the image encoding apparatus 100 that the predictor may generate the prediction signal based on various prediction methods (techniques) which will be described later.

The intra predictor 265 may predict the current block by referring to the samples in the current picture. The description of the intra predictor 185 is equally applied to the intra predictor 265.

The inter predictor 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the predictor (including the inter predictor 260 and/or the intra predictor 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter predictor 260. The memory 250 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 250 may store reconstructed samples of reconstructed blocks in the current picture and transfer the reconstructed samples to the intra predictor 265.

In the present disclosure, the embodiments described in the filter 160, the inter predictor 180, and the intra predictor 185 of the image encoding apparatus 100 may be equally or correspondingly applied to the filter 240, the inter predictor 260, and the intra predictor 265 of the image decoding apparatus 200.

Example of Coding Layer Structure

A coded video/image according to the present disclosure may be processed, for example, according to a coding layer and structure which will be described below.

Figure 4:
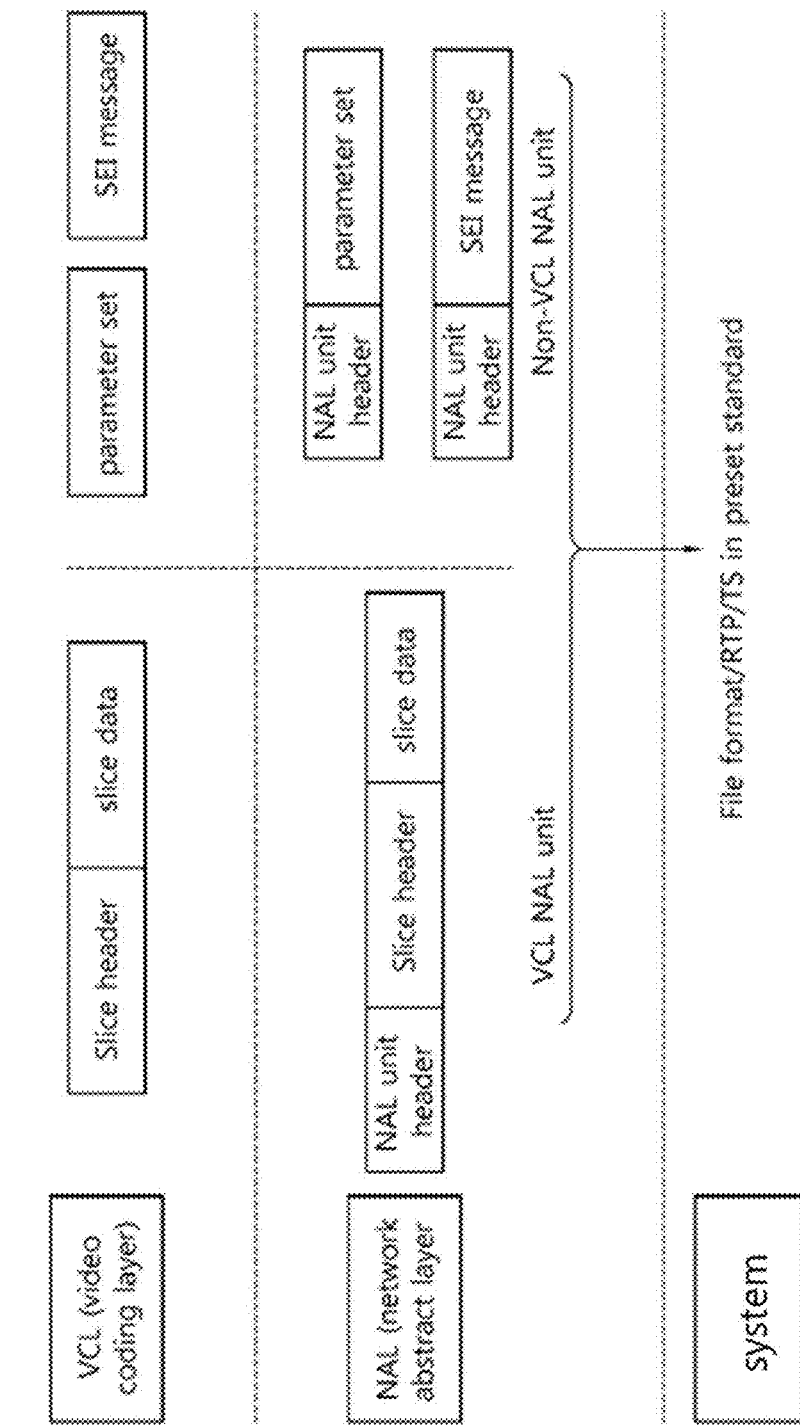
FIG. 4 is a view illustrating an example of a layer structure for a coded image/video.

FIG. 4 is a view illustrating an example of a layer structure for a coded image/video.

The coded image/video is classified into a video coding layer (VCL) for an image/video decoding process and handling itself, a lower system for transmitting and storing encoded information, and a network abstraction layer (NAL) present between the VCL and the lower system and responsible for a network adaptation function.

In the VCL, VCL data including compressed image data (slice data) may be generated or a parameter set including information such as a picture parameter set (PPS), a sequence parameter set (SPS) or a video parameter set (VPS) or a supplemental enhancement information (SEI) message additionally required for a decoding process of an image may be generated.

In the NAL, header information (NAL unit header) may be added to a raw byte sequence payload (RBSP) generated in the VCL to generate a NAL unit. In this case, the RBSP refers to slice data, a parameter set, an SEI message generated in the VCL. The NAL unit header may include NAL unit type information specified according to RBSP data included in a corresponding NAL unit.

As shown in FIG. 4, the NAL unit may be classified into a VCL NAL unit and a non-VCL NAL unit according to the type of the RBSP generated in the VCL. The VCL NAL unit may mean a NAL unit including information on an image (slice data), and the Non-VCL NAL unit may mean a NAL unit including information (parameter set or SEI message) required to decode an image.

The VCL NAL unit and the Non-VCL NAL unit may be attached with header information and transmitted through a network according to the data format of the lower system. For example, the NAL unit may be modified into data having a predetermined data format, such as H.266/VVC file format, RTP (Real-time Transport Protocol) or TS (Transport Stream), and transmitted through various networks.

As described above, in the NAL unit, a NAL unit type may be specified according to the RBSP data structure included in the corresponding NAL unit, and information on the NAL unit type may be stored in a NAL unit header and signaled. For example, this may be broadly classified into a VCL NAL unit type and a non-VCL NAL unit type based on whether the NAL unit includes information on an image (slice data). The VCL NAL unit type may be classified according to a property and type of a picture, and the Non-VCL NAL unit type may be classified according to a type of a parameter set.

An example of the NAL unit type specified according to the type of the parameter set/information included in the Non-VCL NAL unit type will be listed below.

DCI (Decoding capability information) NAL unit type (NUT): Type for NAL unit including DCI VPS (Video Parameter Set) NUT: Type for NAL unit including VPS SPS (Sequence Parameter Set) NUT: Type for NAL unit including SPS PPS (Picture Parameter Set) NUT: Type for NAL unit including PPS APS (Adaptation Parameter Set) NUT: Type for NAL unit including APS PH (Picture header) NUT: Type for NAL unit including a picture header The above-described NAL unit types may have syntax information on the NAL unit types, and the syntax information may be stored in a NAL unit header and signaled. For example, the syntax information may include nal_unit_type, and the NAL unit types may be specified by a value of nal_unit_type.

Meanwhile, one picture may include a plurality of slices, and one slice may include a slice header and slice data. In this case, one picture header may be further added to a plurality of slices (slice header and slice data set) in one picture. The picture header (picture header syntax) may include information/parameters commonly applicable to the picture. The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may information/parameters commonly applicable to multiple layers. The DCI (DCI syntax) may include information/parameters related to decoding capability.

In the present disclosure, a high level syntax (HLS) may include at least one of the APS syntax, the PPS syntax, the SPS syntax, the VPS syntax, the DCI syntax, the picture header syntax or the slice header syntax. In addition, in the present disclosure, a low level syntax (LLS) may include, for example, a slice data syntax, a CTU syntax, a coding unit syntax, a transform unit syntax, etc.

In the present disclosure, image/video information encoded by encoding apparatus and signaled to the decoding apparatus in the form of a bitstream may include not only in-picture partitioning related information, intra/inter prediction information, residual information, in-loop filtering information but also information on the slice header, information on the picture header, information on the APS, information on the PPS, information on the SPS, information on the VPS and/or information on the DCI. In addition, the image/video information may further include general constraint information and/or information on a NAL unit header.

Multi-Layer Based Coding

Image/video coding according to the present disclosure may include multi-layer based image/video coding. The multi-layer based image/video coding may include scalable coding. In multi-layer based coding or scalable coding, input signals may be processed for each layer. According to the layer, input signals (input images/videos) may have different values in terms of at least one of resolution, frame rate, bit-depth, color format, aspect ratio or view. In this case, it is possible to reduce redundant information transmission/processing and to increase compression efficiency, by performing inter-layer prediction using a difference between layers (e.g., based on scalability).

Figure 5:
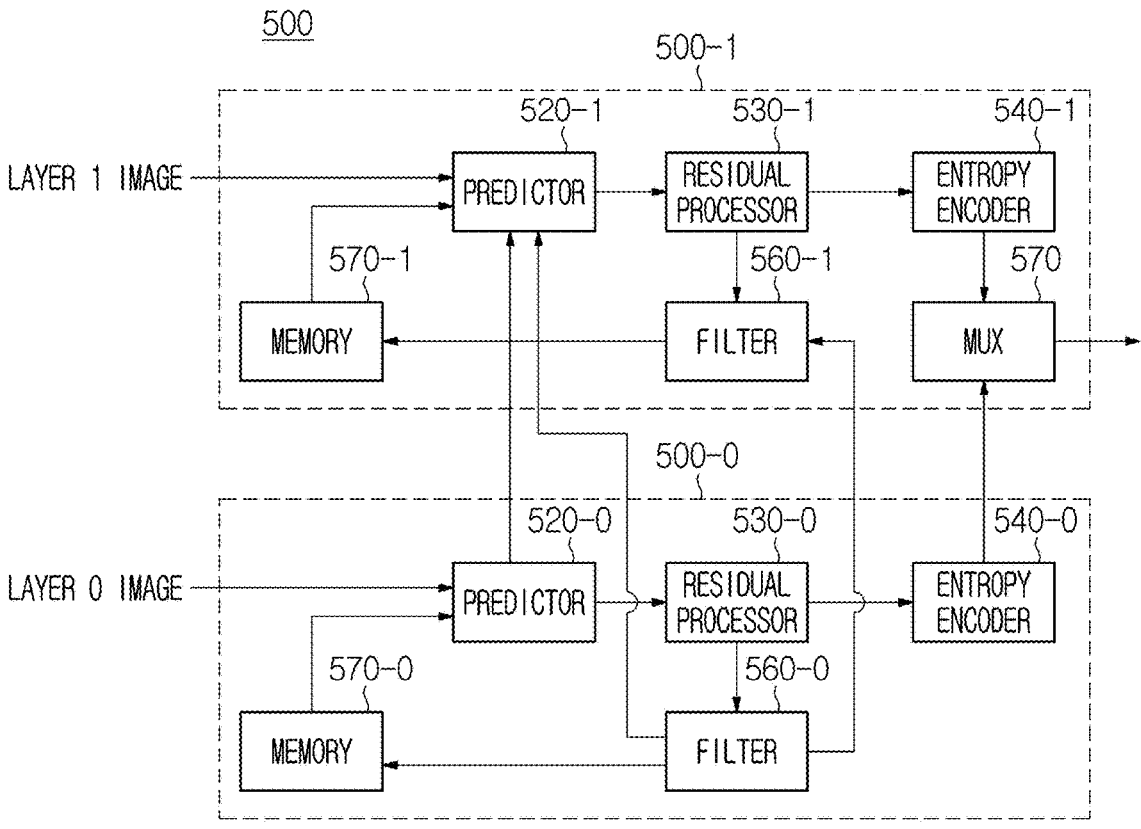
FIG. 5 is a view schematically illustrating a multi-layer encoding apparatus, to which an embodiment of the present disclosure is applicable.

FIG. 5 is a view schematically illustrating a multi-layer encoding apparatus, to which an embodiment of the present disclosure is applicable.

The multi-layer encoding apparatus 500 of FIG. 5 may include the encoding apparatus of FIG. 2. Compared to FIG. 2, the image partitioner 110 and the adder 155 are not shown in the multi-layer encoding apparatus 500 of FIG. 5, the multi-layer encoding apparatus 500 may include the image partitioner 110 and the adder 155. In an embodiment, the image partitioner 110 and the adder 155 may be included in unit of layer. Hereinafter, multi-layer based prediction will be focused upon in the description of FIG. 5. For example, in addition to the following description, the multi-layer encoding apparatus 500 may include the technical idea of the encoding apparatus described above with reference to FIG. 2.

For convenience of description, a multi-layer structure consisting of two layers is shown in FIG. 5. However, the embodiments of the present disclosure are not limited to two layers and the multi-layer structure, to which the embodiment of the present disclosure is applied, may include two or more layers.

Referring to FIG. 5, the encoding apparatus 500 includes an encoder 500-1 of layer 1 and an encoder 500-0 of layer 0. Layer 0 may be a base layer, a reference layer or a lower layer, and layer 1 may be an enhancement layer, a current layer or a higher layer.

The encoder 500-1 of layer 1 may include a predictor 520-1, a residual processor 9305-1, a filter 560-1, a memory 570-1, an entropy encoder 540-1 and a multiplexer (MUX) 570. In an embodiment, the MUX may be included as an external component.

The encoder 500-0 of layer 0 may include a predictor 520-0, a residual processor 530-0, a filter 560-0, a memory 570-0 and an entropy encoder 540-0.

The predictors 520-0 and 520-1 may perform prediction with respect to input images based on various prediction schemes as described above. For example, the predictors 520-0 and 520-1 may perform inter prediction and intra prediction. The predictors 520-0 and 520-1 may perform prediction in a predetermined processing unit. The prediction unit may be a coding unit (CU) or a transform unit (TU). A predicted block (including prediction samples) may be generated according to the result of prediction and, based on this, the residual processor may derive a residual block (including residual samples).

Through inter prediction, prediction may be performed based on information on at least one of a previous picture and/or a next picture of a current picture, thereby generating a prediction block. Through intra prediction, prediction may be performed based on neighboring samples in a current picture, thereby generating a prediction block.

As an inter prediction mode or method, the above-described various prediction modes or methods may be used. In inter prediction, a reference picture may be selected for a current block to be predicted, and a reference block corresponding to the current block may be selected from the reference picture. The predictors 520-0 and 520-1 may generate a predicted block based on the reference block.

In addition, the predictor 520-1 may perform prediction for layer 1 using information on layer 0. In the present disclosure, a method of predicting information on a current layer using information on another layer is referred to as inter-layer prediction, for convenience of description.

Information on a current layer predicted using information on another layer (e.g., predicted by inter-layer prediction) may be at least one of texture, motion information, unit information or a predetermined parameter (e.g., a filtering parameter, etc.).

In addition, information on another layer used for prediction of the current layer (e.g., used for inter-layer prediction) may be at least one of texture, motion information, unit information or a predetermined parameter (e.g., a filtering parameter, etc.).

Inter-layer prediction, a current block may be a block in a current picture in a current layer (e.g., layer 1) and may be a block to be coded. A reference block is a block in a picture (reference picture) belonging to the same access unit (AU) as a picture (current picture), to which the current block belongs, on a layer (reference layer, e.g., layer 0) referred to for prediction of the current block, and may be a block corresponding to the current block.

As an example of inter-layer prediction, there is inter-layer motion prediction for predicting motion information of a current layer using motion information of a reference layer. According to inter-layer motion prediction, motion information of a current block may be predicted using motion information of a reference block. That is, in deriving motion information according to the inter prediction mode which will be described below, a motion information candidate may be derived based on motion information of an inter-layer reference block instead of a temporal neighboring block.

When inter-layer motion prediction is applied, the predictor 520-1 may scale and use reference block (that is, inter-layer reference block) motion information of the reference layer.

As another example of inter-layer prediction, inter-layer texture prediction may use texture of a reconstructed reference block as a prediction value for a current block. In this case, the predictor 520-1 may scale the texture of the reference block by up-scaling. Inter-layer texture prediction may be referred to as inter-layer (reconstructed) sample prediction or simply inter-layer prediction.

In inter-layer parameter prediction which is another example of inter-layer prediction, a derived parameter of a reference layer may be reused in a current layer or a parameter for a current layer may be derived based on a parameter used in a reference layer.

In inter-layer residual prediction which is another example of inter-layer prediction, residual information of a current layer may be predicted using residual information of another layer and, based on this, prediction of a current block may be performed.

In inter-layer difference prediction which is another example of inter-layer prediction, prediction of a current block may be performed using a difference between images obtained by up-sampling or down-sampling a reconstructed picture of a current layer and a reconstructed picture of a reference layer.

In inter-layer syntax prediction which is another example of inter-layer prediction, texture of a current block may be predicted or generated using syntax information of a reference layer. In this case, syntax information of a referenced reference layer may include information on an intra prediction mode and motion information.

A plurality of prediction methods using the above-described inter-layer may be used when predicting a particular block.

Here, as an example of inter-layer prediction, although inter-layer texture prediction, inter-layer motion prediction, inter-layer unit information prediction, inter-layer parameter prediction, inter-layer residual prediction, inter-layer difference prediction, inter-layer syntax prediction, etc. are described, inter-layer prediction applicable in the present disclosure is not limited thereto.

For example, inter-layer prediction may be applied as an extension of inter prediction for a current layer. That is, by including a reference picture derived from a reference layer in reference pictures capable of being referenced for inter prediction of a current block, it is possible to perform inter prediction for the current block.

In this case, the inter-layer reference picture may be included in a reference picture list for the current block. The predictor 520-1 may perform inter prediction for the current block using an inter-layer reference picture.

Here, the inter-layer reference picture may be a reference picture constructed by sampling the reconstructed picture of a reference layer to correspond to the current layer. Accordingly, when the reconstructed picture of the reference layer corresponds to the picture of the current layer, the reconstructed picture of the reference layer may be used as an inter-layer reference picture without sampling. For example, when the widths and heights of samples are the same in the reconstructed picture of the reference layer and the reconstructed picture of the current layer and an offset between the top left end, top right end, bottom left end and bottom right end in the picture of the reference layer and the top left end, top right end, bottom left end and bottom right end in the picture of the current layer is 0, the reconstructed picture of the reference layer may be used as the inter-layer reference picture of the current layer without being sampled again.

In addition, the reconstructed picture of the reference layer, from which the inter-layer reference picture is derived, may be a picture belonging to the same AU as the current picture to be encoded.

When inter prediction for a current block is performed by including an inter-layer reference picture in a reference picture list, the position of the inter-layer reference picture in the reference picture list may be different between reference picture lists L0 and L1. For example, in reference picture list L0, the inter-layer reference picture may be located after short-term reference pictures before the current picture and, in reference picture list L1, the inter-layer reference picture may be located at the end of the reference picture list.

Here, reference picture list L0 is a reference picture list used for inter prediction of P slice or a reference picture list used as a first reference picture list in inter prediction of B slice. Reference picture list L1 may be a second reference picture list used for inter prediction of B slice.

Accordingly, reference picture list L0 may consist of short-term reference picture(s) before the current picture, an inter-layer reference picture, short-term reference picture(s) after the current picture and a long-term reference picture in this order. Reference picture list L1 may consist of short-term reference picture(s) after the current picture, short-term reference picture(s) before the current picture, a long-term reference picture and an inter-layer reference picture in this order.

In this case, a predictive (P) slice is a slice for which intra prediction is performed or inter prediction is performed using a maximum of one motion vector per prediction block and a reference picture index. A bi-predictive (B) slice is a slice for which intra prediction is performed or prediction is performed using a maximum of two motion vectors per prediction block and a reference picture index. In this regard, an intra (I) slice is a slice to which only intra prediction is applied.

In addition, when inter prediction for a current block is performed based on a reference picture list including an inter-layer reference picture, the reference picture list may include a plurality of inter-layer reference pictures derived from a plurality of layers.

When a plurality of inter-layer reference pictures is included, the inter-layer reference pictures may be alternately arranged in reference picture lists L0 and L1. For example, assume that two inter-layer reference pictures such as inter-layer reference picture ILRPi and inter-layer reference picture ILRPj are included in the reference picture list used for inter prediction of the current block. In this case, in reference picture list L0, ILRPi may be located after short-term reference pictures before the current picture and ILRPj may be located at the end of the list. In addition, in reference picture list L1, ILRPi may be located at the end of the list and ILRPj may be located after short-term reference pictures after the current picture.

In this case, reference picture list L0 may consist of short-term reference picture(s) before the current picture, an inter-layer reference picture ILRPi, short-term reference picture(s) after the current picture, a long-term reference picture and an inter-layer reference picture ILRPj in this order. Reference picture list L1 may consist of short-term reference picture(s) after the current picture, an inter-layer reference picture ILRPj, short-term reference picture(s) before the current picture, a long-term reference picture and an inter-layer reference picture ILRPi in this order.

In addition, one of two inter-layer reference pictures may be an inter-layer reference picture derived from a scalable layer for resolution and the other may be an inter-layer reference picture derived from a layer for providing another view. In this case, for example, if ILRPi is an inter-layer reference picture derived from a layer for providing different resolution and ILRPj is an inter-layer reference picture derived from a layer for providing a different view, in the case of scalable video coding supporting only scalability excluding a view, reference picture list L0 may consist of short-term reference picture(s) before the current picture, an inter-layer reference picture ILRPi, short-term reference picture(s) after the current picture, and a long-term reference picture in this order, and reference picture list L1 may consist of short-term reference picture(s) after the current picture, short-term reference picture(s) before the current picture, a long-term reference picture and an inter-layer reference picture ILRPi in this order.

Meanwhile, in inter-layer prediction, as information on an inter-layer reference picture, only a sample value may be used, only motion information (motion vector) may be used or both a sample value and motion information may be used. The predictor 520-1 may use only a sample vale of the inter-layer reference picture, may use only motion information (motion vector) of the inter-layer reference picture or may use both the sample value and motion information of the inter-layer reference picture according to information received from the encoding apparatus, when the reference picture index indicates an inter-layer reference picture.

When only the sample value of the inter-layer reference picture is used, the predictor 520-1 may derive samples of a block specified by a motion vector from the inter-layer reference picture as a prediction sample of a current block. In the case of scalable video coding which does not take a view into consideration, a motion vector in inter prediction (inter-layer prediction) using an inter-layer reference picture may be set to a fixed value (e.g., 0).

When only the motion information of the inter-layer reference picture is used, the predictor 520-1 may use a motion vector specified by the inter-layer reference picture as a motion vector predictor for deriving the motion vector of the current block. In addition, the predictor 520-1 may use a motion vector specified by the inter-layer reference picture as the motion vector of the current block.

When both the sample value and motion information of the inter-layer reference picture are used, the predictor 520-1 may use, for prediction of the current block, a sample of a region corresponding to the current block in the inter-layer reference picture and motion information (motion vector) specified in the inter-layer reference picture.

The encoding apparatus may transmit a reference index indicating an inter-layer reference picture in a reference picture list to the decoding apparatus, when inter-layer prediction is applied, and may transmit, to the decoding apparatus, information for specifying which information (sample information, motion information or sample information and motion information) is used from the inter-layer reference picture, that is, information for specifying a dependency type of dependency for inter-layer prediction between two layers.

Figure 6:
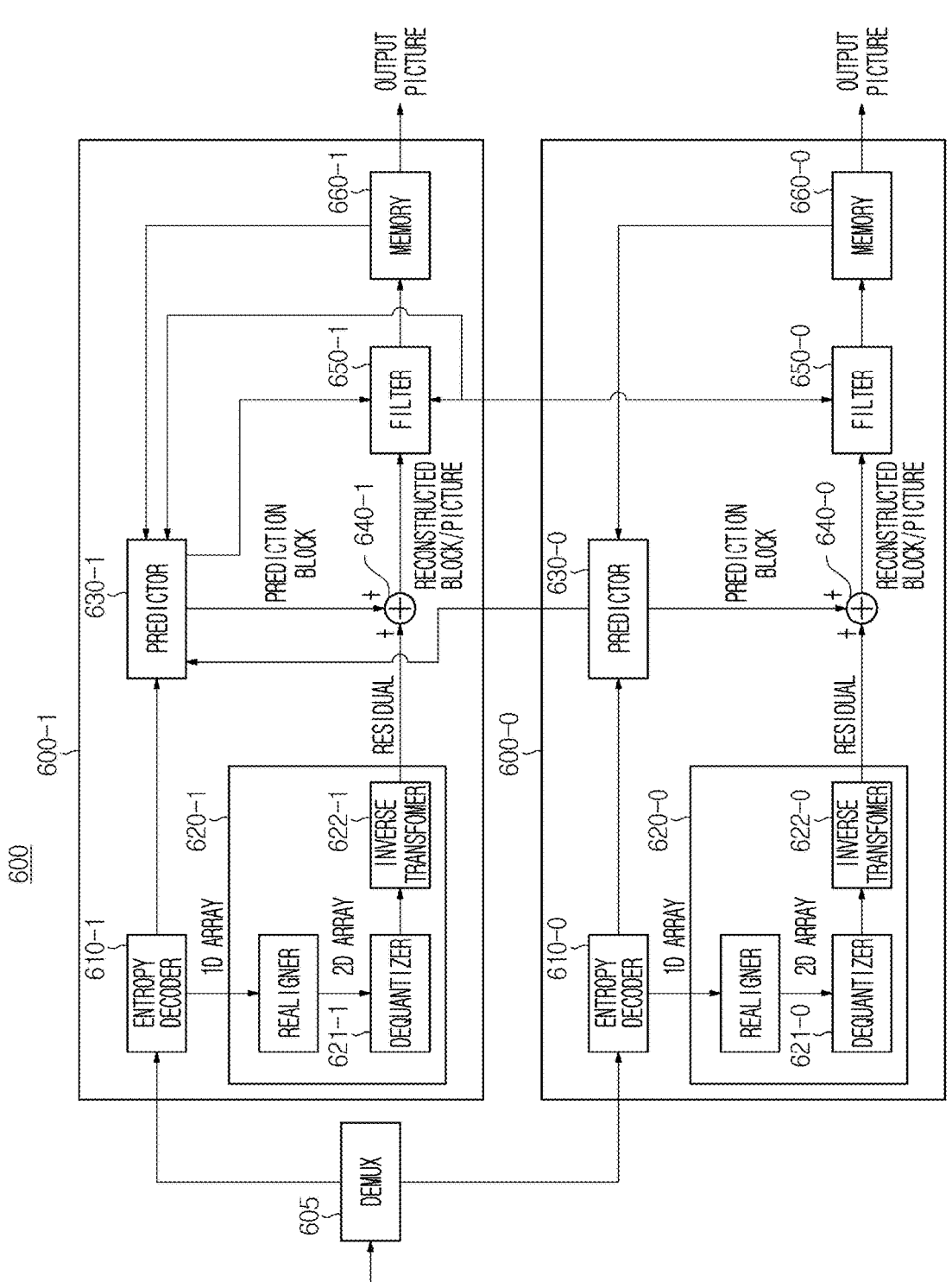
FIG. 6 is a view schematically illustrating a multi-layer decoding apparatus, to which an embodiment of the present disclosure is applicable.

FIG. 6 is a view schematically illustrating a multi-layer decoding apparatus, to which an embodiment of the present disclosure is applicable.

The decoding apparatus of FIG. 6 may include the decoding apparatus of FIG. 3. A realigner shown in FIG. 6 may be omitted or included in a dequantizer. In the description of this drawing, multi-layer based prediction will be focused upon. In addition, the description of the decoding apparatus of FIG. 3 may be included.

In the example of FIG. 6, for convenience of description, a multi-layer structure consisting of two layers will be described. However, it should be noted that embodiments of the present disclosure are not limited thereto, and the multi-layer structure, to which the embodiment of the present disclosure is applied, may include two or more layers.

Referring to FIG. 6, the decoding apparatus 600 may include a decoder 600-1 of layer 1 and a decoder 600-0 of layer 0. The decoder 600-1 of layer 1 may include an entropy decoder 610-1, a residual processor 620-1, a predictor 630-1, an adder 640-1, a filter 650-1 and a memory 660-1. The decoder 600-0 of layer 0 may include an entropy decoder 610-0, a residual processor 620-0, a predictor 630-0, an adder 640-0, a filter 650-0 and a memory 660-0.

When a bitstream including image information is received from the encoding apparatus, a DEMUX 605 may demultiplex information for each layer and transmit the information to the decoding apparatus for each layer.

The entropy decoders 610-1 and 610-0 may perform decoding in correspondence with a coding method used in the encoding apparatus. For example, when CABAC is used in the encoding apparatus, the entropy decoders 610-1 and 610-0 may perform entropy decoding using CABAC.

When a prediction mode for a current block is an intra prediction mode, the predictors 630-1 and 630-0 may perform intra prediction for the current block based on neighboring reconstructed samples in the current picture.

When an prediction mode for a current block is an inter prediction mode, the predictors 630-1 and 630-0 may perform inter prediction for the current block based on information included in at least one of picture before or after the current picture. Some or all of motion information necessary for inter prediction may be derived by checking information received from the encoding apparatus.

When a skip mode is applied as an inter prediction mode, residual is not transmitted from the encoding apparatus and a prediction block may be a reconstructed block.

Meanwhile, the predictor 630-1 of layer 1 may perform inter prediction or intra prediction using only information on layer 1 and perform inter-layer prediction using information on another layer (layer 0).

As information on a current layer predicted using information on another layer (e.g., predicted by inter-layer prediction), there may be at least one of texture, motion information, unit information, a predetermined parameter (e.g., a filtering parameter, etc.).

As information on another layer used for prediction of the current layer (e.g., used for inter-layer prediction), there may be at least one of texture, motion information, unit information, a predetermined parameter (e.g., a filtering parameter, etc.).

In inter-layer prediction, a current block may be a block in a current picture in a current layer (e.g., layer 1) and may be a block to be decoded. A reference block may be a block in a picture (reference picture) belonging to the same access unit (AU) as a picture (current picture), to which the current block belongs, on a layer (reference layer, e.g., layer 0) referenced for prediction of the current block and may be a block correspond to the current block.

The multi-layer decoding apparatus 600 may perform inter-layer prediction as described in the multi-layer encoding apparatus 500. For example, the multi-layer decoding apparatus 600 may perform inter-layer texture prediction, inter-layer motion prediction, inter-layer unit information prediction, inter-layer parameter prediction, inter-layer residual prediction, inter-layer difference prediction, inter-layer syntax prediction, etc., as described in the multi-layer encoding apparatus 500 and inter-layer prediction applicable in the present disclosure is not limited thereto.

The predictor 630-1 may perform inter-layer prediction using an inter-layer reference picture, when a reference picture index received from the encoding apparatus or a reference picture index derived from a neighboring block indicates an inter-layer reference picture in a reference picture list. For example, the predictor 630-1 may derive a sample value of a region specified by a motion vector in the inter-layer reference picture as a prediction block for a current block, when a reference picture index indicates an inter-layer reference picture.

In this case, the inter-layer reference picture may be included in a reference picture list for a current block. The predictor 630-1 may perform inter prediction for the current block using the inter-layer reference picture.

As described above in the multi-layer encoding apparatus 500, in operation of the multi-layer decoding apparatus 600, the inter-layer reference picture may be a reference picture constructed by sampling a reconstructed picture of a reference layer to correspond to a current layer. Processing for the case where the reconstructed picture of the reference layer corresponds to the picture of the current layer may be performed in the same manner as the encoding process.

In addition, as described above in the multi-layer encoding apparatus 500, in operation of the multi-layer decoding apparatus 600, a reconstructed picture of a reference layer, from which an inter-layer reference picture is derived, may be a picture belonging to the same AU as a current picture to be encoded.

In addition, as described above in the multi-layer encoding apparatus 500, in operation of the multi-layer decoding apparatus 600, when inter prediction for a current block is performed by including the inter-layer reference picture in a reference picture list, the position of the inter-layer reference picture in the reference picture list may be different between reference picture lists L0 and L1.

In addition, as described above in the multi-layer encoding apparatus 500, in operation of the multi-layer decoding apparatus 600, when inter prediction for a current block is performed based on a reference picture list including an inter-layer reference picture, the reference picture list may include a plurality of inter-layer reference pictures derived from a plurality of layers, and arrangement of inter-layer reference pictures may be performed to correspond to that described in the encoding process.

In addition, as described above in the multi-layer encoding apparatus 500, in operation of the multi-layer decoding apparatus 600, as information on an inter-layer reference picture, only a sample value may be used, only motion information (motion vector) may be used or both a sample value and motion information may be used.

The multi-layer decoding apparatus 600 may receive a reference index indicating an inter-layer reference picture in a reference picture list from the multi-layer encoding apparatus 500 and perform inter-layer prediction based on the same. In addition, the multi-layer decoding apparatus 600 may receive, from the multi-layer encoding apparatus 900, information for specifying which information (sample information, motion information or sample information and motion information) is used from the inter-layer reference picture, that is, information for specifying a dependency type of dependency for inter-layer prediction between two layers.

Subpicture Based Encoding/Decoding

VVC allows a picture to be divided into a plurality of subpictures, tiles and/or slices. A subpicture may include one or more slices and configure a rectangular region in a picture. In the picture, the sizes of the subpictures may be differently set. In contrast, for all pictures belonging to one sequence, the sizes and positions of particular individual subpictures may be equally set.

Various coding tools related to the subpicture may be used to increase image encoding/decoding efficiency. For example, based on one picture being divided into a plurality of subpictures, encoding/decoding processes of the plurality of subpictures may be performed in parallel (parallel processing). Parallel processing is especially beneficial for high resolution real-time coding of videos/images. Additionally, parallel processing may reduce information sharing between tiles, thereby reducing memory constraints. Parallel architectures benefit from picture division mechanism because subpictures, slices and/or tiles can be distributed over different threads during the parallel processing. For example, in deriving candidate motion information in inter prediction, a neighboring block in a different subpicture/slice/tile may be considered unavailable. Context information used to code information/syntax elements may be initialized in each subpicture/slice/tile.

FIG. 7 is a view illustrating an example of a subpicture.

Referring to FIG. 7, a picture may be partitioned into 18 tiles: 12 tiles on the left-hand side each covering one slice of 4×4 (=16) CTUs and 6 tiles on the right-hand side each covering 2 vertically-stacked slices of 2×2 (=4) CTUs, altogether resulting in 24 slices and 24 subpictures of varying dimensions (each slice is a subpicture).

Information on a subpicture may be signalled in a higher level syntax, for example, an SPS. The information on the subpicture may include information on the identifiers, number and positions of subpictures. In addition, the information on the subpicture may include information indicating whether each subpicture is treated as a picture. When the subpicture is treated as a picture, the picture may be independently encoded/decoded regardless of encoding/decoding result of another subpicture. Here, independent encoding/decoding may mean that a block partitioning structure (e.g., a single tree structure, a dual tree structure, etc.) of a subpicture, a prediction mode type (e.g., intra prediction, inter prediction, etc.), a decoding order, etc. may be set differently from another subpicture. For example, when a first subpicture is encoded/decoded based on an intra prediction mode, a second subpicture adjacent to the first subpicture and treated as a picture may be encoded/decoded based on an inter prediction mode.

FIG. 8 is a view illustrating an example of an SPS including information on a subpicture.

Referring to FIG. 8, the SPS may include a syntax element subpic_info_present_flag. subpic_info_present_flag may specify whether there is subpicture information for a CLVS (coded layer video sequence). For example, subpic_info_present_flag equal to a first value (e.g., 1) may specify that there is subpicture information for the CLVS and there are one or more subpictures within each picture in the CLVS. In contrast, subpic_info_present_flag equal to a second value (e.g., 0) may specify that there is no subpicture information for the CLVS and there is only one subpicture within each picture in the CLVS. When res_change_in_clvs_allowed_flag is equal to a first value (e.g., 1), the value of subpic_info_present_flag shall be equal to a second value (e.g., 0). Here, res_change_in_clvs_allowed_flag equal to a first value (e.g., 1) may specify that picture space resolution is not changed in all CLVSs referring to the SPS.

Meanwhile, when a bitstream is the result of a sub-bitstream extraction process and contains only a subset of subpictures of the input bitstream to the sub-bitstream extraction process, it might be required to set the value of subpic_info_present_flag equal to 1 in a raw byte sequence payload (RBSP) of the SPSs.

In addition, the SPS may include a syntax element sps_num_subpics_minus1. sps_num_subpics_minus1 plus 1 may specify the number of subpictures in each picture in the CLVS. The value of sps_num_subpics_minus1 shall be in the range of 0 to Ceil (pic_width_max_in_luma_samples÷CtbSizeY)×Ceil (pic_height_max_in_luma_samples÷CtbSizeY)−1, inclusive. Meanwhile, when sps_num_subpics_minus1 is not present (that is, it is not signalled), the value of sps_num_subpics_minus1 may be inferred to be equal to a first value (e.g., 0).

In addition, the SPS may include a syntax element sps_independent_subpics_flag. sps_independent_subpics_flag may specify whether a subpicture boundary is independent. For example, sps_independent_subpics_flag equal to a first value (e.g., 1) may specify that all subpicture boundaries in the CLVS are treated as picture boundaries and there is not loop filtering across the subpicture boundaries. In contrast, sps_independent_subpics_flag equal to a second value (e.g., 0) may specify that such a constraint is not imposed. When sps_independent_subpics_flag is not present, the value of sps_independent_subpics_flag may be inferred to be equal to a second value (e.g., 0).

In addition, the SPS may include a syntax element subpic_treated_as_pic_flag[i]. subpic_treated_as_pic_flag[i]

may specify whether a subpicture is treated as a picture. For example, subpic_treated_as_pic_flag[i] equal to a first value (e.g., 1) may specify that the i-th subpicture of each coded picture in the CLVS is treated as a picture in the decoding process excluding in-loop filtering operations. In contrast, subpic_treated_as_pic_flag[i] equal to a second value (e.g., 0) may specify that the i-th subpicture of each coded picture in the CLVS is not treated as a picture in the decoding process excluding in-loop filtering operations. When sub-pic_treated_as_pic_flag[i] is not present, the value of sub-pic_treated_as_pic_flag[i] may be inferred to be equal to sps_independent_subpics_flag.

In addition, the SPS may include a syntax element loop_filter_across_subpic_enabled_flag[i]. loop_filter_across_subpic_enabled_flag[i] may specify whether an in-loop filtering operation may be performed across a subpicture boundary. For example, loop_filter_across_sub-pic_enabled_flag[i] equal to a first value (e.g., 1) may specify that the in-loop filtering operation may be performed across the boundary of the i-th subpicture in each coded picture in the CLVS. In contrast, loop_filter_across_subpi-c_enabled_flag[i] equal to a second value (e.g., 0) may specify that may not be performed across the boundary of the i-th subpicture in each coded picture in the CLVS. When loop_filter_across_subpic_enabled_flag[i] is not signalled, the value of loop_filter_across_subpic_enabled_flag[i] may be inferred to be equal to 1−sps_independent_subpics_flag.

Meanwhile, when a bitstream contains a plurality of layers and pictures in each layer have more than one subpicture, currently it may be constrained that picture size, subpicture layout, and the value of loop_filter_across_sub-pic_enabled_flag[i] shall be aligned. However, the value of subpic_treated_as_pic_flag[i] is not constrained to be aligned. This may cause a problem that a subpicture is not correctly extracted from the bitstream.

In order to solve such a problem, according to an embodiment of the present disclosure, for a plurality of subpictures belonging to different layers in a multi-layer structure, the value of subpic_treated_as_pic_flag[i] shall be aligned under a predetermined condition. Therefore, a subpicture extraction process may be correctly performed.

Hereinafter, embodiments of the present disclosure will be described in greater detail with reference to the accompanying drawings.

Embodiment 1

According to Embodiment 1, when a subpicture is an independently coded subpicture and a current layer containing a current subpicture is an output layer, it may be constrained that a corresponding subpicture in all reference layers (of a current subpicture) of the current layer shall also be independently coded subpicture.

Whether a current layer is an output layer may be determined based on output layer set mode information (e.g., vps_ols_mode_idc) obtained from a bitstream. For example, vps_ols_mode_idc equal to a first value (e.g., 0) may specify that only the highest layer in each output layer set (OLS) specified by a video parameter set (VPS) is an output layer. vps_ols_mode_idc equal to a second value (e.g., 1) may specify that all layers in each OLS specified by a video parameter set (VPS) are output layers. vps_ols_mode_idc equal to a third value (e.g., 2) may specify that, for each OLS specified by a video parameter set (VPS), output layers are explicitly signalled and other layers are direct or indirect reference layers of the output layers.

When vps_ols_mode_idc is equal to a third value (e.g., 2), whether a current layer is an output layer may be determined based on an output layer flag (e.g., vps_ols_output_layer_flag[i][j]) obtained from a bitstream. For example, ols_output_layer_flag[i][j] equal to a first value (e.g., 1) may specify that the layer with nuh_layer_id equal to vps_lay-er_id[j] is an output layer of the i-th OLS when ols_mod-e_idc is equal to a third value (e.g., 2). ols_output_layer_flag[i][j] equal to a second value (e.g., 0) may specify that the layer with nuh_layer_id equal to vps_layer_id[j] is not an output layer of the i-th OLS when ols_mode_idc is equal to a third value (e.g., 2). Here, nuh_layer_id is a syntax element signalled in a NAL unit header, and may indicate the identifier of the NAL unit. In addition, vps_layer_id[j] may indicate the nuh_layer_id value of a j-layer.

In Embodiment 1, the corresponding subpicture may mean a subpicture included in a corresponding picture having a reference relationship with a current picture among pictures having the same picture order count (POC) value as a current picture including a current subpicture. Here, the reference relationship may mean a case in which the corresponding picture has the current picture as an entry (e.g., active entry) in the reference picture list (e.g., RefPicList[0] or RefPicList[1]). However, embodiments of the present disclosure are not limited thereto and, for example, the case where a current picture has a corresponding picture as an active entry in a reference picture list or both the above-described cases (that is, cross-reference relationship) may be included in the reference relationship.

In an example, the corresponding subpicture may be a collocated subpicture belonging to the same position as the current subpicture within the corresponding picture. That is, the corresponding subpicture may have the same width and height as the current subpicture in the corresponding picture. Also, the coordinate value indicating the upper-left position of the corresponding subpicture may be the same as the coordinate value indicating the upper-left position of the current subpicture.

The corresponding picture containing a corresponding subpicture may refer to one or more entries including the current picture within a reference picture list. That is, the current picture may be an inter-layer reference picture of the corresponding picture. Here the inter-layer reference picture may mean a reference picture constructed by sampling a reconstructed picture of a reference layer to correspond to a current layer. Accordingly, when the reconstructed picture of the reference layer corresponds to the picture of the current layer, the reconstructed picture of the reference layer may be used as an inter-layer reference picture without separate sampling. For example, when the sample width and height are the same between the reconstructed picture of the reference layer and the reconstructed picture of the current layer and an offset between the top left end, top right end, bottom left end and bottom right end in the picture of the reference layer and the top left end, top right end, bottom left end and bottom right end in the picture of the current layer is 0, the reconstructed picture of the reference layer may be used as it is as the inter-layer reference picture of the current layer.

The current picture may be included in the reference picture list (e.g., RefPicList[i][j]) of the corresponding picture, based on having nuh_layer_id equal to refPicLayerId and a POC value equal to the corresponding picture. Here, refPicLayerId may specify a nuh_layer_id value of a layer having a direct reference relationship with a layer including the corresponding picture. Accordingly, the current picture having the same nuh_layer_id as refPicLayerId may mean that the current picture belongs to the direct reference layer of the layer including the corresponding picture.

Meanwhile, when subpic_treated_as_pic_flag[i] is equal to a first value (e.g., 1) indicating that an i-th subpicture is independently coded, it is a requirement of bitstream conformance that all of the following conditions are true for each output layer and its reference layers in an OLS that includes the layer containing the i-th subpicture as an output layer.

(Condition 1): All pictures in the output layer and its reference layers shall have the same value of pic_width_in_luma_samples and the same value of pic_height_in_luma_samples.

(Condition 2): All the SPSs referred to by the output layer and its reference layers shall have the same value of sps_num_subpics_minus1 and shall have the same values of subpic_ctu_top_left_x[j], subpic_ctu_top_left_y [j], subpic_width_minus1[j], subpic_height_minus1[j], loop_filter_across_subpic_enabled_flag[j] and subpic_treated_as_pic_flag[j], respectively, for each value of j in the range of 0 to sps_num_subpics_minus1, inclusive.

(Condition 3) All pictures in each access unit in the output layer and its reference layers shall have the same value of SubpicIdVal[j] for each value of j in the range of 0 to sps_num_subpics_minus1, inclusive.

In Condition 1, pic_width_in_luma_samples may specify a picture width in luma sample unit, and pic_height_in_luma_samples may specify a picture height in luma sample unit. In addition, in Condition 3, SubpicIdVal[j] may specify the identifier of the j-th subpicture.

Hereinafter, according to constraints of Embodiment 1, an example of a method of determining whether to independently code a subpicture will be described in detail.

Figure 9:
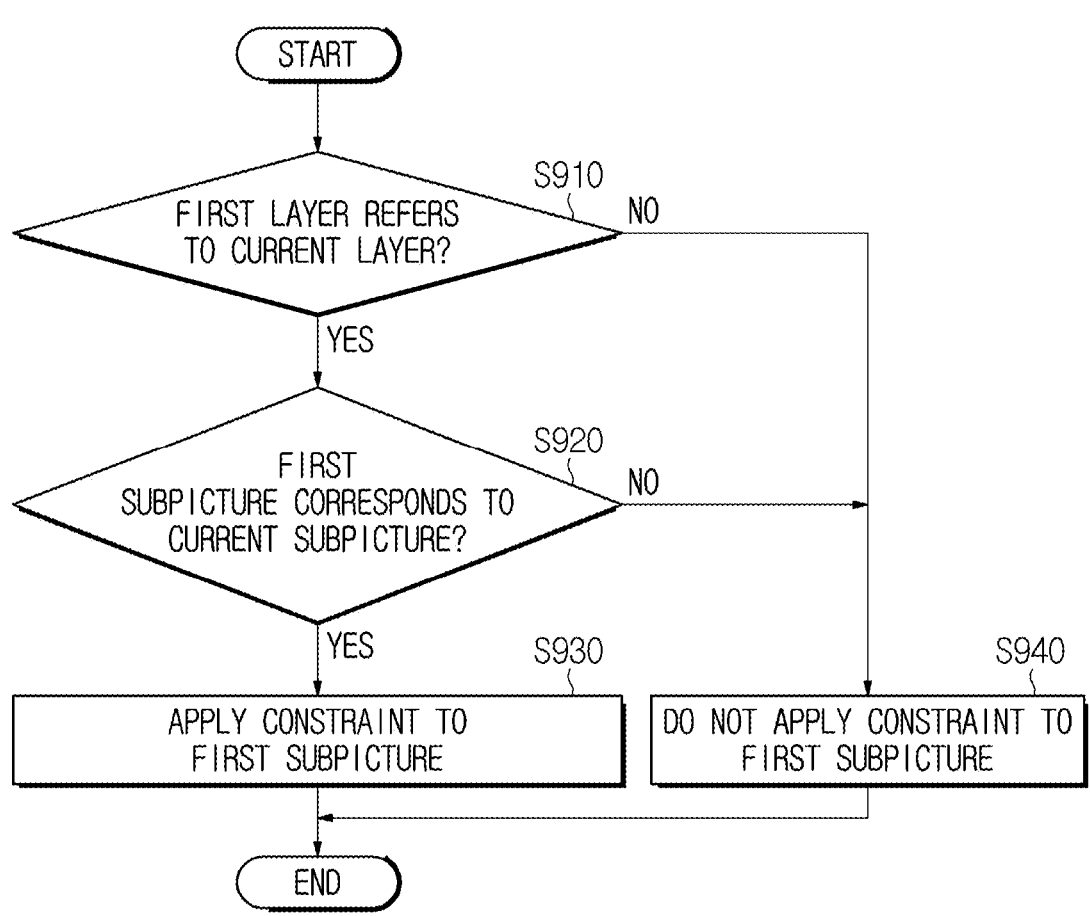
FIG. 9 is a flowchart illustrating a method of determining whether to independently code a subpicture under a multi-layer structure, by an image encoding apparatus according to an embodiment of the present disclosure.

FIG. 9 is a flowchart illustrating a method of determining whether to independently code a subpicture under a multi-layer structure, by an image encoding apparatus according to an embodiment of the present disclosure.

Referring to FIG. 9, the image encoding apparatus may determine whether a predetermined first layer refers to a current layer under a multi-layer structure (S910). In an example, when the current layer has a predetermined direct reference index (e.g., refPicLayerId) as nuh_layer_id, the current layer may be determined as a reference layer of the first layer.

When the first layer refers to the current layer ("YES" of S910), the image encoding apparatus may determine whether a first subpicture included in the first layer is a corresponding subpicture of a current subpicture (S920). In this case, the current layer may be an output layer in an output layer set (OLS). In addition, first flag (e.g., subpic_treated_as_pic_flag[i]) for the current subpicture may be equal to a first value (e.g., 1) indicating that the current subpicture is independently coded.

Whether the first subpicture is the corresponding subpicture of the current subpicture may be determined based on there is a reference relationship between pictures. For example, when a first picture including the first subpicture refers to a current picture including the current subpicture, the first subpicture may be the corresponding subpicture of the current subpicture. In contrast, when the first picture including the first subpicture does not refer to the current picture including the current subpicture, the first subpicture may not be the corresponding subpicture of the current subpicture.

When the first subpicture is the corresponding subpicture of the current subpicture ("YES" of S920), a first flag (e.g., subpic_treated_as_pic_flag[i]) for the first subpicture may be determined to be a first value (e.g., 1) indicating that the first subpicture is independently coded, according to the constraint of Embodiment 1.

In contrast, when the first layer including the first subpicture does not refer to the current layer ("NO" of S910) or when the first subpicture is not the corresponding subpicture of the current subpicture ("NO" of S920), the image encoding apparatus may determine that the first flag (e.g., subpic_treated_as_pic_flag[i]) for the first subpicture is equal to a first value (e.g., 1) or a second value (e.g., 0). That is, in this case, the constraint of Embodiment 1 may not be applied.

According to Embodiment 1, between subpictures belonging to different layers in the multi-layer structure, the value of the first flag (e.g., subpic_treated_as_pic_flag[i]) may be aligned under a predetermined condition. Therefore, the subpicture may be correctly obtained from the bitstream through the subpicture extraction process.

Embodiment 2

According to Embodiment 2, when there are one or more pictures belonging to a layer different from a current layer and having a current picture as an entry (e.g., active entry) in a reference picture list, the i-th subpicture in a current picture and the i-th subpicture in the picture shall have the same value of the first flag (e.g., subpic_treated_as_pic_flag).

Figure 10:
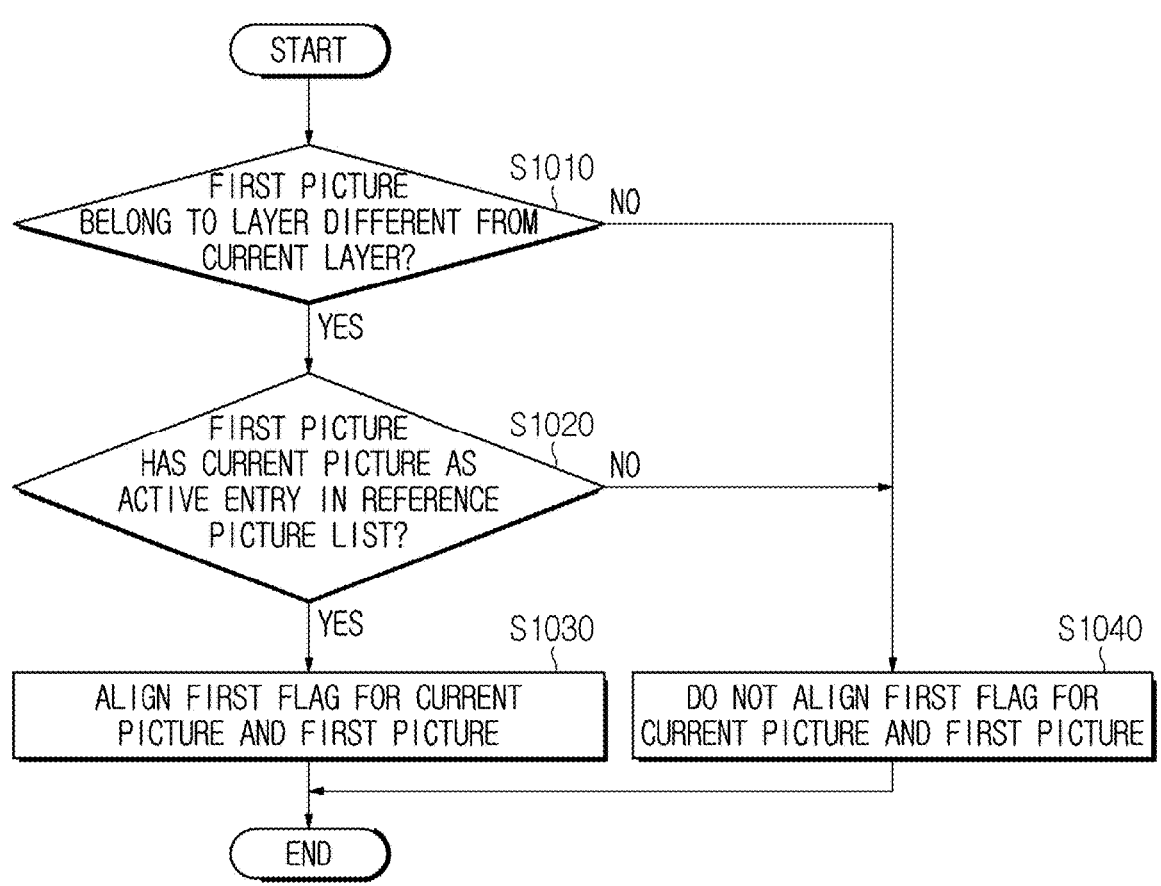
FIG. 10 is a flowchart illustrating a method of determining whether to independently code a subpicture under a multi-layer structure, by an image decoding apparatus according to an embodiment of the present disclosure.

According to the constraint of Embodiment 2, an example of a method of determining whether to independently code a subpicture is shown in FIG. 10.

FIG. 10 is a flowchart illustrating a method of determining whether to independently code a subpicture under a multi-layer structure, by an image decoding apparatus according to an embodiment of the present disclosure.

Referring to FIG. 10, the image encoding apparatus may determine whether a predetermined first picture belongs to a layer different from a current layer (S1010).

When the first picture belongs to the layer different from the current layer ("YES" of S1010), the image encoding apparatus may determine whether the first picture has the current picture as an entry (e.g., active entry) in a reference picture list (S1020). That is, the image encoding apparatus may determine whether the first picture refers to the current picture.

When the first picture has the current layer as the entry in the reference picture list ("YES" of S1020), the image encoding apparatus may align a first flag (e.g., subpic_treated_as_pic_flag) value for the current picture and the first picture. For example, by alignment, the i-th subpicture of the current picture and the i-th subpicture of the first picture may have the same value of the first flag.

In contrast, when the first picture belongs to the same layer as the current layer ("NO" of S1010) or when the first picture does not have the current layer as the entry in the reference picture list ("NO" of S1020), the image encoding apparatus may not align the first flag (e.g., subpic_treated_as_pic_flag[i]) value for the current picture and the first picture. In this case, for the i-th subpicture of the current picture and the i-th subpicture of the first picture, the first flag may have the same value or different values. However, without being limited to the above example, when the first picture belongs to the same layer as the current layer ("NO" of S1410) or when the first picture does not have the current layer as the active entry in the reference picture list ("NO" of S1420), the image encoding apparatus may align, may not align or individually determine the first flag (e.g., subpic- _treated_as_pic_flag) value for the current picture and the first picture, for example, based on determination of another condition.

According to Embodiment 2, between pictures belonging to different layers in the multi-layer structure, the value of the first flag (e.g., subpic_treated_as_pic_flag[i]) may be aligned under a predetermined condition. Therefore, the subpicture may be correctly obtained from the bitstream through the subpicture extraction process.

Hereinafter, an image encoding/decoding method according to embodiments of the present disclosure will be described.

Figure 11:
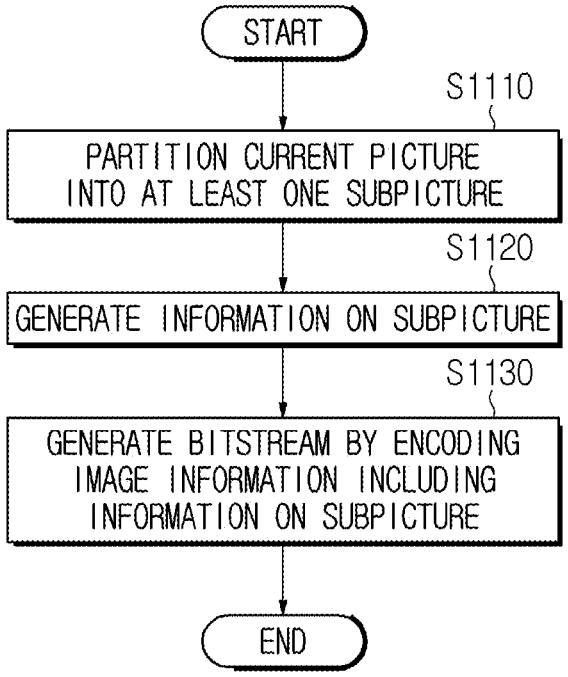
FIG. 11 is a flowchart illustrating an image encoding method according to an embodiment of the present disclosure.

FIG. 11 is a flowchart illustrating an image encoding method according to an embodiment of the present disclosure. The image encoding method of FIG. 11 may be performed by the image encoding apparatus of FIG. 2.

Referring to FIG. 11, the image encoding apparatus may partition a current picture into one or more subpictures (S1110). In addition, the image encoding apparatus may generate subpicture information on one or more subpictures in the current picture (S1120).

The subpicture information may include information on the number, size and/or layout of subpictures. In addition, the subpicture information may include a first flag (e.g., subpic_treated_as_pic_flag[i]) indicating whether each subpicture is treated as a picture (or, each subpicture is independently coded). In this case, subpic_treated_as_pic_flag[i] equal to a first value (e.g., 1) may indicate that an i-th subpicture is treated as a picture. In contrast, subpic_treated_as_pic_flag[i] equal to a second value (e.g., 0) may indicate that an i-th subpicture is not treated as a picture.

The image encoding apparatus may encode the current subpicture based on the subpicture information. In this case, the current subpicture may be independently coded based on the first flag. In addition, the image encoding apparatus may generate a bitstream by encoding image information including the subpicture information (S1130). In this case, the bitstream for the current subpicture may be referred to as a sub-stream or a sub-bitstream.

In an embodiment, based on the bitstream including at least one first layer referring to a current layer, to which a current picture belongs, a first flag for the first subpicture included in the first layer and corresponding to the current subpicture, and a first flag for the current subpicture may have the same value. For example, when the first flag for the current subpicture is equal to a first value (e.g., 1), the first flag for the first subpicture corresponding to the current subpicture may also be equal to a first value (e.g., 1). This may be referred to as parameter alignment and, in some embodiments, the parameter alignment may be defined as a constraint for bitstream conformance.

In an embodiment, a first picture including the first subpicture may have the current picture including the current subpicture as an entry (e.g., active entry) in a reference picture list. That is, the first picture may refer to the current picture. In this case, based on the number of subpictures in the current picture being two or more and the current subpicture is treated as a picture (e.g., subpic_treat_as_pic_flag[i]=1), the first picture including the first subpicture and the current picture may have the same width and the same height. In addition, based on the number of subpictures in the current picture being two or more and the current subpicture is treated as a picture (e.g., subpic_treat_as_pic_flag[i]=1), the first picture including the first subpicture and the current picture may include the same number of subpictures.

In an embodiment, the current layer may be included in an output layer set as an output layer.

In an embodiment, based on the boundaries of the subpicture are not treated as picture boundaries being not applied, the subpicture information may further include a second flag (e.g., loop_filter_across_subpic_enabled_flag[i]) indicating whether in-loop filtering operation across the boundaries of the current subpictures is capable of being performed. For example, as described above with reference to FIG. 12, when sps_independent_subpics_flag is equal to a second value (e.g., 0), loop_filter_across_subpic_enabled_flag[i] may be obtained/parsed from a bitstream. In this case, loop_filter_across_subpic_enabled_flag[i] equal to a first value (e.g., 1) may specify that in-loop filtering operation across the boundaries of the current subpictures is capable of being performed. In contrast, loop_filter_across_subpic_enabled_flag[i] equal to a second value (e.g., 0) may specify that in-loop filtering operation across the boundaries of the current subpictures is not capable of being performed.

Figure 12:
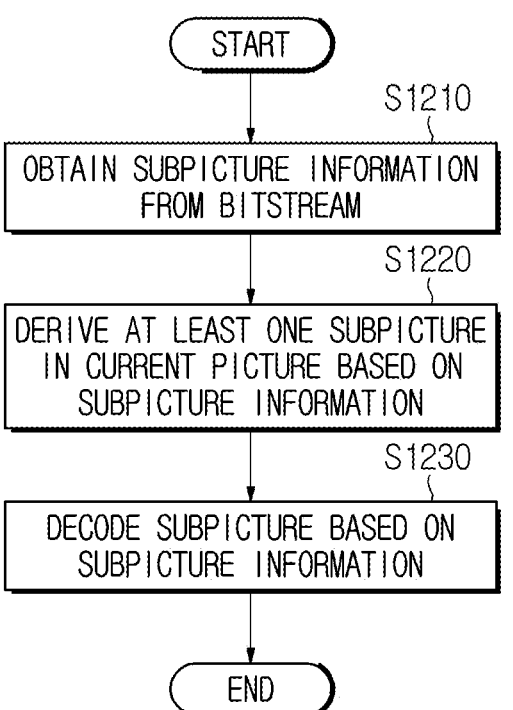
FIG. 12 is a flowchart illustrating an image decoding method according to an embodiment of the present disclosure.

FIG. 12 is a flowchart illustrating an image decoding method according to an embodiment of the present disclosure. The image decoding method of FIG. 12 may be performed by the image decoding apparatus of FIG. 3.

Referring to FIG. 12, the image decoding apparatus may obtain subpicture information from a bitstream (S1210). The subpicture information may include the number, size and/or layout of subpictures. In addition, the subpicture information may include a first flag (e.g., subpic_treated_as_pic_flag[i]) specifying whether each subpicture in the current picture is treated as a picture (that is, each subpicture is independently coded).

The image decoding apparatus may derive one or more subpictures in a current picture based on the subpicture information (S1220). In addition, the image decoding apparatus may decode one or more subpictures based on the subpicture information (S1230). For example, when a current subpicture including the current block is treated as a picture, the current subpicture may be independently decoded. In addition, when in-loop filtering across the boundary of the current subpicture is capable of being performed, in-loop filtering (e.g., deblocking filtering) may be performed with respect to the boundary of the current subpicture and the boundary of a neighboring subpicture adjacent to the boundary. In addition, when the boundary of the current subpicture matches a picture boundary, in-loop filtering across the boundary of the current subpicture may not be performed. The image decoding apparatus may decode the subpicture based on a CABAC method, a prediction method, a residual processing method (transform or quantization), and an in-loop filtering method. In addition, the image decoding apparatus may output at least one decoded subpicture or a current picture including at least one subpicture. The decoded subpicture may be output in the form of an output sub-picture set (OPS).

In an embodiment, based on the bitstream including at least one first layer referring to a current layer, to which the current picture belongs, a first flag for the first subpicture included in the first layer and corresponding to the current subpicture, and a first flag for the current subpicture may have the same value. For example, when the first flag for the current subpicture is equal to a first value (e.g., 1), the first flag for the first subpicture corresponding to the current subpicture may also be equal to a first value (e.g., 1). This may be referred to as parameter alignment and, in some embodiments, the parameter alignment may be defined as a constraint for bitstream conformance.

In an embodiment, a first picture including the first subpicture may have the current picture including the current subpicture as an entry (e.g., active entry) in a reference picture list. That is, the first picture may refer to the current picture. In this case, based on the number of subpictures in the current picture being two or more and the current subpicture is treated as a picture (e.g., subpic_treat_as_pic_flag[i]=1), the first picture including the first subpicture and the current picture may have the same width and the same height. In addition, based on the number of subpictures in the current picture being two or more and the current subpicture is treated as a picture (e.g., subpic_treat_as_pic_flag[i]=1), the first picture including the first subpicture and the current picture may each include the same number of subpictures.

In an embodiment, a current layer may be included in an output layer set as an output layer.

In an embodiment, based on the boundaries of the current subpicture being treated as picture boundaries, the first flag for the current subpicture may not be obtained/parsed from bitstream and may be set (or inferred) to a predetermined value (e.g., 1) indicating that the current subpicture is treated as a picture. For example, as described above with reference to FIG. 8, when sps_independent_subpics_flag[i] is equal to a first value (e.g., 1), subpic_treated_as_pic_flag[i] may be inferred to have the same first value (e.g., 1) as sps_independent_subpics_flag without being obtained.

In an embodiment, based on the boundaries of the current subpicture are not treated as picture boundaries, the subpicture information may further include a second flag (e.g., loop_filter_across_subpic_enabled_flag[i]) specifying whether in-loop filtering operation across the boundaries of the current subpicture is capable of being performed. For example, as described above with reference to FIG. 8, when sps_independent_subpics_flag is equal to a second value (e.g., 0), loop_filter_across_subpic_enabled_flag[i] may be obtained/parsed from a bitstream. In this case, loop_filter_across_subpic_enabled_flag[i] equal to a first value (e.g., 1) may specify that in-loop filtering operation across the boundaries of the current subpicture is capable of being performed. In contrast, loop_filter_across_subpic_enabled_flag[i] equal to a second value (e.g., 0) may specify that in-loop filtering operation across the boundaries of the current subpicture is not capable of being performed.

According to the embodiments of the present disclosure, between subpictures belonging to different layers in the multi-layer structure, the value of subpic_treated_as_pic_flag[i] may be aligned under a predetermined condition. Therefore, the subpicture may be correctly obtained from the bitstream through the subpicture extraction process.

The name of the syntax element described in the present disclosure may include information on a position where the corresponding syntax element is signaled. For example, a syntax element starting with "sps_" may mean that the corresponding syntax element is signaled in a sequence parameter set (SPS). In addition, a syntax element starting with "pps_", "ph_", "sh_" may mean that the corresponding syntax element is signaled in a picture parameter set (PPS), a picture header and a slice header, respectively.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 13:
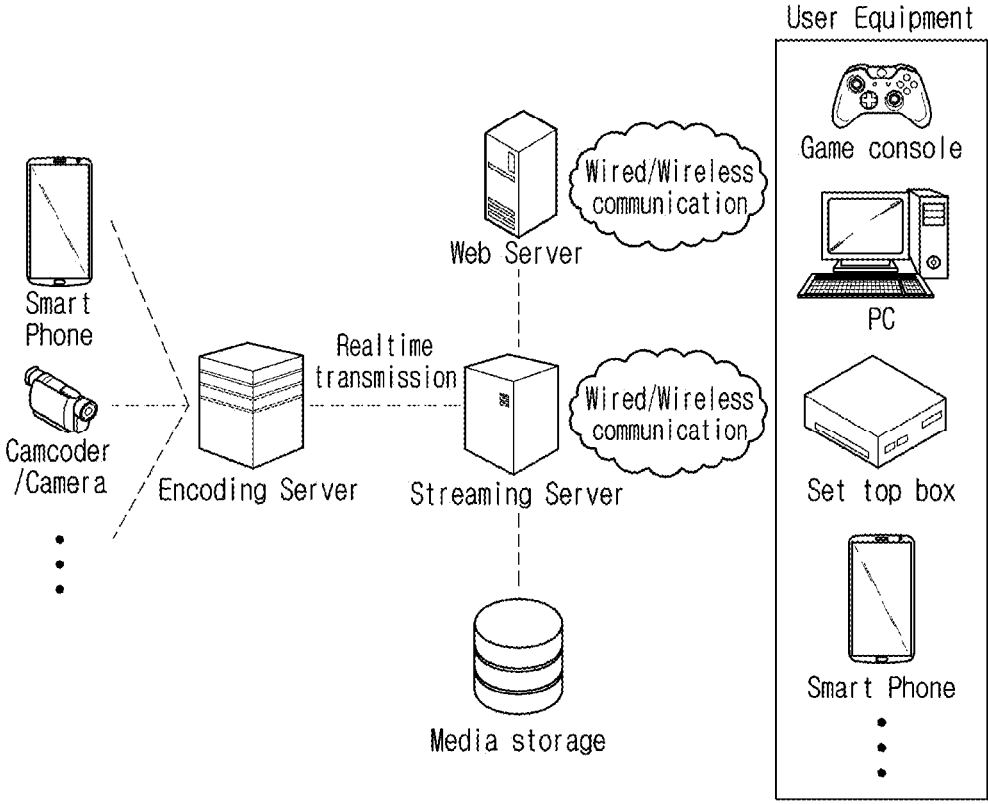
FIG. 13 is a view illustrating a content streaming system, to which an embodiment of the present disclosure is applicable.

FIG. 13 is a view illustrating a content streaming system, to which an embodiment of the present disclosure is applicable.

As shown in FIG. 13, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:
 obtaining, by the image decoding apparatus, subpicture information from a bitstream;
 deriving, by the image decoding apparatus, one or more subpictures in a current picture based on the subpicture information; and
 decoding, by the image decoding apparatus, a current subpicture in the current picture based on the subpicture information,
 wherein, based on a constraint on boundaries of the one or more subpictures not being imposed, the subpicture information comprises a first flag specifying whether each of the one or more subpictures is treated as a picture,
 wherein the constraint is to treat the boundaries of the one or more subpictures as picture boundaries,
 wherein, based on the bitstream including at least one first layer referring to a current layer including the current picture, the first flag for a first subpicture included in the first layer and the first flag for the current subpicture have the same value, and
 wherein the first subpicture corresponds to the current subpicture.

2. The image decoding method of claim 1, wherein a first picture including the first subpicture has the current picture as an entry in a reference picture list of the first picture.

3. The image decoding method of claim 1, wherein, based on the number of the one or more subpictures being two or more and the current subpicture being treated as a picture, a first picture including the first subpicture and the current picture have the same width and the same height.

4. The image decoding method of claim 1, wherein, based on the number of the one or more subpictures being two or more and the current subpicture being treated as a picture, a first picture including the first subpicture and the current picture include the same number of subpictures.

5. The image decoding method of claim 1, wherein the current layer is included in an output layer set as an output layer.

6. The image decoding method of claim 1, wherein the first flag has a predetermined value specifying the current subpicture being treated as a picture, based on boundaries of the current subpicture being treated as picture boundaries.

7. The image decoding method of claim 1, wherein the subpicture information further comprises a second flag specifying whether in-loop filtering operation across a boundary of the current subpicture is capable of being performed, based on boundaries of the current subpicture being not treated as picture boundaries.

8. An image encoding method performed by an image encoding apparatus, the image encoding method comprising:
 partitioning, by the image encoding apparatus, a current picture into one or more subpictures;
 generating, by the image encoding apparatus, a subpicture information on the one or more subpictures; and
 generating, by the image encoding apparatus, a bitstream by encoding image information including the subpicture information,
 wherein, based on a constraint on boundaries of the one or more subpictures not being imposed, the subpicture information comprises a first flag specifying whether each of the one or more subpictures is treated as a picture,
 wherein the constraint is to treat the boundaries of the one or more subpictures as picture boundaries,
 wherein, based on the bitstream including at least one first layer referring to a current layer including the current picture, the first flag for a first subpicture included in the first layer and the first flag for the current subpicture have the same value, and
 wherein the first subpicture corresponds to the current subpicture.

9. The image encoding method of claim 8, wherein a first picture including the first subpicture has the current picture as an entry in a reference picture list of the first picture.

10. The image encoding method of claim 8, wherein, based on the number of the one or more subpictures being two or more and the current subpicture being treated as a picture, a first picture including the first subpicture and the current picture have the same width and the same height.

11. The image encoding method of claim 8, wherein, based on the number of the one or more subpictures being two or more and the current subpicture being treated as a picture, a first picture including the first subpicture and the current picture include the same number of subpictures.

12. The image encoding method of claim 8, wherein the current layer is included in an output layer set as an output layer.

13. The image encoding method of claim 8, wherein the subpicture information further comprises a second flag specifying whether in-loop filtering operation across a boundary of the current subpicture is capable of being performed, based on boundaries of the current subpicture being not treated as picture boundaries.

14. A method for transmitting a bitstream, the method comprising:

obtaining, by an encoding apparatus, the bitstream generated by an image encoding method; and transmitting, by an encoding apparatus, the bitstream, wherein the image encoding method comprising:

partitioning a current picture into one or more subpictures; generating a subpicture information on the one or more subpictures; and generating a bitstream by encoding image information including the subpicture information, wherein, based on a constraint on boundaries of the one or more subpictures not being imposed, the subpicture information comprises a first flag specifying whether each of the one or more subpictures is treated as a picture, wherein the constraint is to treat the boundaries of the one or more subpictures as picture boundaries, wherein, based on the bitstream including at least one first layer referring to a current layer including the current picture, the first flag for a first subpicture included in the first layer and the first flag for the current subpicture have the same value, and wherein the first subpicture corresponds to the current subpicture.

\*   \*   \*   \*   \*